(12) United States Patent  
Sennett et al.

(10) Patent No.: US 8,910,294 B1  
(45) Date of Patent: Dec. 9, 2014

(54) SYSTEM AND METHOD FOR APPLICATION FAILURE TESTING IN A CLOUD COMPUTING ENVIRONMENT

(71) Applicant: State Farm Mutual Automobile Insurance Company, Bloomington, IL (US)

(72) Inventors: Michael A. Sennett, Bloomington, IL (US); Brian William Batronis, Normal, IL (US); John Paul Tippabattuni, Bloomington, IL (US); Kevin Joseph Alcozar, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 14/133,071

(22) Filed: Dec. 18, 2013

(51) Int. Cl.  
  *H04L 29/06* (2006.01)
(52) U.S. Cl.  
  CPC .................................. *H04L 63/1433* (2013.01)  
  USPC .............................................. 726/25; 726/26
(58) Field of Classification Search  
  CPC ................................................. H04L 63/1433  
  USPC ......................................................... 726/25  
  See application file for complete search history.

(56) References Cited

U.S. PATENT DOCUMENTS

| | | | |
|---|---|---|---|
| 6,691,259 B1 * | 2/2004 | Mackey et al. ................. | 714/46 |
| 7,735,116 B1 * | 6/2010 | Gauvin ............................. | 726/2 |
| 2007/0130427 A1 * | 6/2007 | Lahti et al. ..................... | 711/133 |
| 2008/0189769 A1 * | 8/2008 | Casado et al. ..................... | 726/4 |
| 2008/0244525 A1 * | 10/2008 | Khalil et al. .................. | 717/124 |
| 2009/0288084 A1 * | 11/2009 | Astete et al. ....................... | 718/1 |
| 2011/0231843 A1 * | 9/2011 | Shimogawa ....................... | 718/1 |
| 2012/0084607 A1 * | 4/2012 | Lam et al. ..................... | 714/38.1 |
| 2012/0311392 A1 * | 12/2012 | Agrawal ....................... | 714/738 |
| 2013/0042222 A1 * | 2/2013 | Maddela ........................ | 717/124 |
| 2013/0060507 A1 * | 3/2013 | Kianovski et al. ............ | 702/123 |

OTHER PUBLICATIONS

"Mule Management Console," Webpage: http://www.mulesoft.org/documentation/display/current/Mule+Management+Console, Feb. 16, 2013, 3 pages.  
"vCenter Server," Webpage: http://www.vmware.com/products/vcenter-server, Sep. 15, 2009, 4 pages.  
"CA LISA Service Virtualization," Webpage: http://www.itko.com/solutions/service_virtualization.jsp, Jun. 22, 2011, 2 pages.  
"WANem: The Wide Area Network Emulator," Webpage: http://wanem.sourceforge.net/, Sep. 2, 2007, 34 pages.

(Continued)

*Primary Examiner* — Mohammad L Rahman  
(74) *Attorney, Agent, or Firm* — Marshall, Gerstein & Borun LLP (57) ABSTRACT

A method and apparatus may rapidly test applications by causing or simulating failures within nodes of a cloud computing system in support of both application and infrastructure testing. The method and system may support a variety of "attacks" including the ability to stop or freeze application servers, insert latency or drop packets between servers, constrain CPU or memory, and disable various software flows and applications. Rather than randomly inserting random failures or simulated failures into cloud-based computing system nodes to test their durability and the efficacy of particular applications or services that are executing within the system, the system and methods include a user interface for manually controlling the system attacks.

17 Claims, 7 Drawing Sheets

(56) References Cited

OTHER PUBLICATIONS

"Netem", Webpage: http://linuxfoundation.org/collaborate/workgroups/networking/netem, , Nov. 19, 2009, 4 pages.
"Chaos Monkey Released Into the Wild," Webpage: http://techblog.netflix.com/2012/07/chaos-monkey-released-into-wild.html, Jul. 30, 2012, 6 pages.
"Simian Army," Webpage: https://github.com/Netflix/SimianArmy/wiki, Jan. 2, 2013, 1 page.
"Vaurien, the Chaos TCP Proxy," Webpage: http://vaurien.readtehdocs.org/en/1.8/index.html, 2012, 6 pages.
Hubert, "tc—show / manipulate traffic control settings," Webpage: http://lartc.org/manpages.tc.txt, Dec. 16, 2001, 6 pages.
"Gauntlt," Webpage: https://github.com/guantlt/gauntlt/blob/master/README.md, May 11, 2012, 4 pages.
Wickett, "Security testing with gauntlt," Webpage: http://www.slideshare.net/wickett/security-testing-with-gauntlt#, May 11, 2012, 6 pages.
"Fuzz testing," Webpage: http://en.wikipedia.org/wiki/Fuzz_testing, Wikipedia, Jun. 5, 2005, 5 pages.

\* cited by examiner

Welcome admin
Attack Window Active

| | AttackId | TargetName | AttackPattern | CreatedBy | CreateTime | AttackStatus |
|---|---|---|---|---|---|---|
| Attack Windows | 291 | tcsv00000002038 | shutdownVirtualMachine | admin | 01/08/2013 15:00 | Active |
| Attack Logs | 281 | mule00000000505 | disableMuleFlow | admin | 01/07/2013 16:54 | Reverted |
| Config Item Templates | 271 | mule00000000505 | dropNetworkPackrts | admin | 01/07/2013 16:53 | Failed |
| Environments + | 261 | mule00000000505 | constrainMemory | admin | 01/07/2013 16:53 | Failed |
| | 251 | mule00000000505 | constrainMemory | admin | 01/07/2013 16:49 | Requested |
| Developer Ref-App | 241 | mule00000000505 | disableMuleFlow | admin | 01/07/2013 16:49 | Reverted |
| | 231 | tcsv00000002038 | constrainCPU | admin | 01/07/2013 16:48 | Requested |
| | 221 | mule00000000505 | constrainCPU | admin | 01/07/2013 16:48 | Reverted |

Previos 1 2 Next...

SYSTEM AND METHOD FOR APPLICATION FAILURE TESTING IN A CLOUD COMPUTING ENVIRONMENT

TECHNICAL FIELD

The present disclosure generally relates to a system and method for testing applications and services within a cloud computing environment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Testing distributed applications is often a time consuming and expensive process. In a cloud computing environment, testing often involves general stress tests, load and performance tests, functions test, data latency, browser performance, and compatibility. These tests lead to several challenges in a cloud computing environment. For example, merely writing tests to cover an adequate number of cases is costly and time consuming. Delivering services in a cloud environment and avoiding outages requires testing both inside and outside the application's datacenter. Likewise, simulating user activity from different geographic locations may only increase challenges to testing in a cloud computing environment.

Prior testing systems focused on randomized failures to test application functions. For example, Chaos Monkey is a testing service based on initiating random failures and is provided by Netflix of Los Gatos, Calif. This random testing service seeks out Auto Scaling Groups (ASGs) on the AWS platform and randomly terminates system node instances (i.e., virtual machines) in each group. Over time, this random approach may resolve most problems that a cloud-based application may face. However, random testing fails to account for some scenarios that are critical for proper application testing. In random testing systems, users cannot customize the type and timing of failure modes within their testing environment for particular intricacies of a cloud-provisioned application.

SUMMARY

A testing system may include functions to assemble and execute tests in a cloud computing environment without involving several active teams of testers and technicians or sizable financial and time expenditures. The system may be implemented with a user interface to allow developers to configure test cases for application. Through the user interface, the system may identify a particular environment for an application by analyzing the application to determine which servers and other network devices the application uses. Then, the system may initiate tasks or tests on the identified servers to create conditions for testing the application. The system may act as a broker between the servers that control the application being tested during the testing process. For example, after determining a testing environment, the system may access the appropriate servers and create conditions for one or more test cases. Where the case indicates a database server malfunction, the system may send one or more signals to the tested application indicating that these servers are down or cause the environment to respond to an application request as if these servers are down. Further, the test cases may issue commands at the operating system level to drop packets during communication between the servers in the testing environment. In short, except where the testing environment involves sensitive resources that are shared between active applications that are not part of the test, the system may cause the tested components to fail in the same way as an actual or unexpected system failure.

In one embodiment, a computer-implemented method for testing computer code in a cloud computing environment may provision a computer code file via a module interface to an automation service. The computer code file may include a discrete file or package of files corresponding to a complete application or an update for the application for execution on a plurality of cloud computing system nodes. The method may also determine one or more cloud computing system nodes that the computer code file utilizes during execution in the cloud and receive data that defines one or more attack conditions for the determined cloud computing system nodes at the automation service via the module interface. The attack conditions may include one or more of an attack window along with identifications of users that are allowed to take advantage of the window, an attack environment, and parameters for the determined cloud computing system nodes.

In another embodiment, a computer device for testing computer code in a cloud computing environment the computer device may comprise one or more processors and one or more memories coupled to the one or more processors. The one or more memories may include computer executable instructions stored therein that, when executed by the one or more processors, cause the one or more processors to provision a computer code file via a module interface to an automation service. The computer code file may include a discrete file or package of files corresponding to a complete application or an update for the application for execution on a plurality of cloud computing system nodes. The instructions may also cause the one or more processors to determine one or more cloud computing system nodes that the computer code file utilizes during execution in the cloud and receive data that defines one or more attack conditions for the determined cloud computing system nodes at the automation service via the module interface. The attack conditions may include one or more of an attack window along with identifications of users that are allowed to take advantage of the window, an attack environment, and parameters for the determined cloud computing system nodes.

In still another embodiment, a tangible computer-readable medium including non-transitory computer readable instructions stored thereon for testing computer code in a cloud computing environment may provision a computer code file via a module interface to an automation service. The computer code file may include a discrete file or package of files corresponding to a complete application or an update for the application for execution on a plurality of cloud computing system nodes. The tangible computer-readable medium may also determine one or more cloud computing system nodes that the computer code file utilizes during execution in the cloud, and receive data that defines one or more attack conditions for the determined cloud computing system nodes at the automation service via the module interface. The attack conditions may include one or more of an attack window along with identifications of users that are allowed to take advantage of the window, an attack environment, and parameters for the determined cloud computing system nodes.

The features and advantages described in this summary and the following detailed description are not all-inclusive. Many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
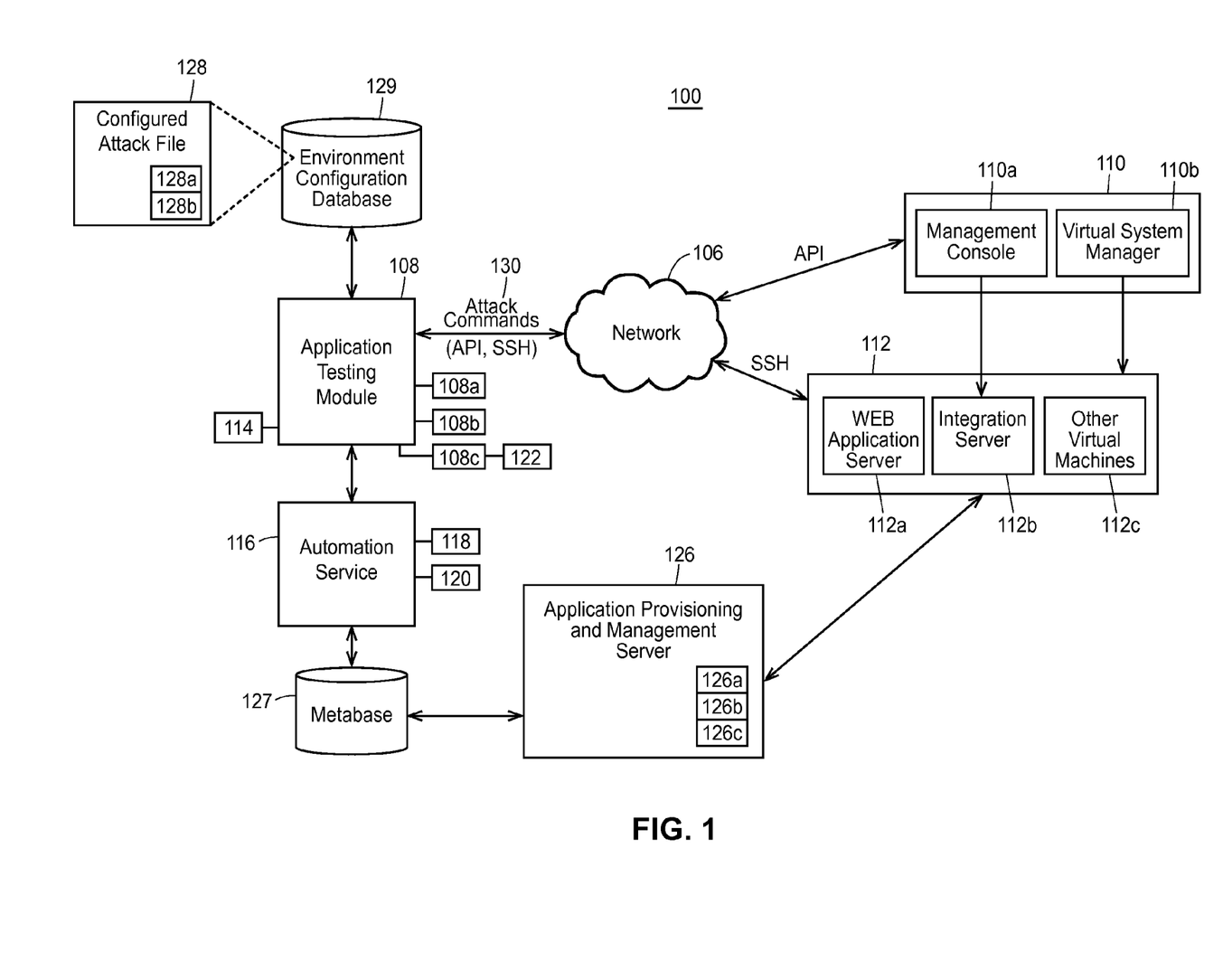
FIG. 1 illustrates a block diagram of a system for testing applications in a cloud computing environment.

With reference to FIG. 1, a system 100 for testing applications and other code in a cloud computing environment may include various components or nodes in communication with each other via a communication link 106 (e.g., computer network). Generally, the system 100 may perform both application failure point testing and infrastructure testing. FIG. 1 illustrates a block diagram of a high-level architecture of an application testing system 100 including various software and hardware components or modules that may employ a method to configure testing conditions and test applications and other code executing in a cloud computing environment. The various modules may be implemented as tangible computer-readable storage memories including non-transitory computer-readable instructions stored thereon (i.e., software) for execution by a processor of the computer system 100. The modules may perform the various tasks associated with configuring application tests, conducting application tests, and verifying testing procedures for applications and other code within a cloud computing system. The computer system 100 may also include both hardware and software applications as well as various data communications channels for communicating data between the various hardware and software components.

The application testing system 100 may include various components and nodes that may communicate code and other data to complete application and service testing in a cloud computing system. For example, the system 100 may include an application testing module 108 and an automation service 116. In some embodiments, an automation service includes a system component that retrieves information about applications or application components that have been provisioned within the cloud computing environment described herein. The testing module 108 may include an interface for communicating code, testing configuration parameters, and other data to other components of the application testing system 100. In some embodiments, the module 108 may communicate through an API with monitoring and management components 110. For example, the monitoring and management components may include an interface for configuring and monitoring the system 100 or system monitor 110a (e.g., a Mule Management Console or MMC) and a platform for managing virtual infrastructure 110b (e.g., a VMWare® vCenter Server™)

The module 108 may also securely communicate data and instructions using a cryptographic network protocol (e.g., SSH and its variants) to application components 112 running on various virtual machines. For example, the module 108 may use SSH to communicate data and instructions to applications components such as a web application server 112a (e.g., Apache Tomcat server, a SpringSource® or VMware® vFabric tc Server, etc.), an enterprise service bus and integration platform server 112b (e.g., a MuleSoft™ Mule ESB server, etc.), and to other virtual machines 112c. In some embodiments, the module 108 may be implemented as a cloud or web-based application executing with a web browser application on a computing device of an application developer or other entity to test new code in a cloud computing environment. As a web-based application, the module 108 may use the memory and processing services of a server which may be local or remote. For example, the computing device including a browser and application testing module 108 may include a memory 108a storing various instructions or functions described herein, and a processor 108b for application testing. For example, the module 108 may include a client browser 108c that may execute instructions to access a memory 118 using a processor 120 to display a graphical interface (GUI) 122 for the application testing system 100. The GUI 122 may be displayed within the browser 108c executing with the module 108. In some embodiments the module 108 includes a computing device that executes instructions stored in the memory 108a using the processor 108b to identify virtual servers provisioned in a cloud computing system comprising an application, create/edit/delete attack configurations on the application, select application testing conditions through the GUI 122, cause the backend components to build one or more testing scenarios, execute an application testing process for the application or service, check the status of an attack, and revert an attack. The application or service may include a discrete file or package of files for a complete application or an application or service update. The application or service may be written for execution on one or more of a plurality of cloud computing system nodes.

An application provisioning and management server 126 may include a memory 126a storing instructions for execution by a processor 126b to store configured parameters and other information corresponding to an application and the application's dependencies on other assets within the system 100 or outside the system for testing the provisioned application code used in a cloud computing system using the module 108. In some embodiments, the automation service 116 uses data from the application provisioning and management server 126 to build a metabase 127 to provide information about the code and the operating environment of the application or service (e.g., data assets, data repositories, servers, network devices, active nodes, etc., that the provisioned application uses during operation) to the module 108 for application testing. The system 100 may also include a configured attack file 128 stored within an environment configuration database 129. The configured attack file 128 may include cloud computing system nodes 128a (e.g., "configuration item instances"), configuration parameters 128b, and other data to launch an attack on the system 100 to test code within a cloud computing system, as described herein. With the configured attack file 128 and/or other resources, the system 100 may launch attack commands 130 via multiple methods across the network 106.

With reference to FIGS. 2a-4, the system 100 described herein may be employed in a method 200 (FIG. 2a) to test application or service code while executing within a cloud computing system. The method 200 may include one or more functions or routines in the form of non-transitory computer-executable instructions that are stored in a tangible computer-readable storage medium and executed using a processor of a computing device (e.g., the module 108, the automation service 116, or any combination of computing devices or nodes within the system 100). The routines may be included as part of any of the modules or instructions described in relation to FIG. 1, above, FIG. 4, below, or as part of a module that is external to the system illustrated by FIGS. 1 and 4.

Figure 2A:
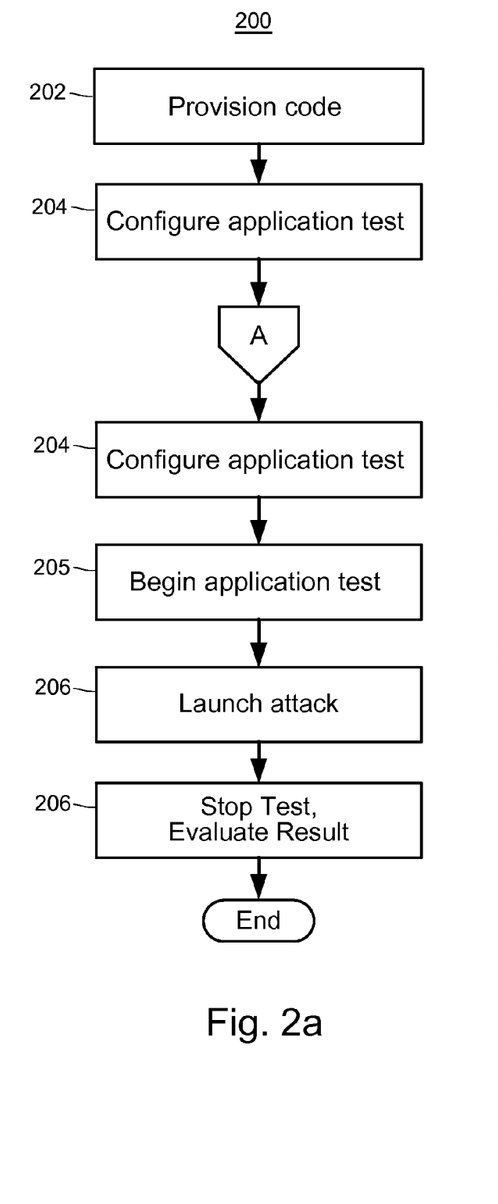
FIG. 2a illustrates one embodiment of a flowchart for a method for application testing in a cloud computing system.

At function 202, the method 200 may provision one or more application code files or service scripts to the system 100 using the application provisioning and management server 126. For example, a user may access a user interface 126c of the server 126 and cause provisioned application code to be provisioned to various nodes of the system 100. The provisioned application code may then be executed and tested within the system 100 using any of the system components described herein.

Figure 2B:
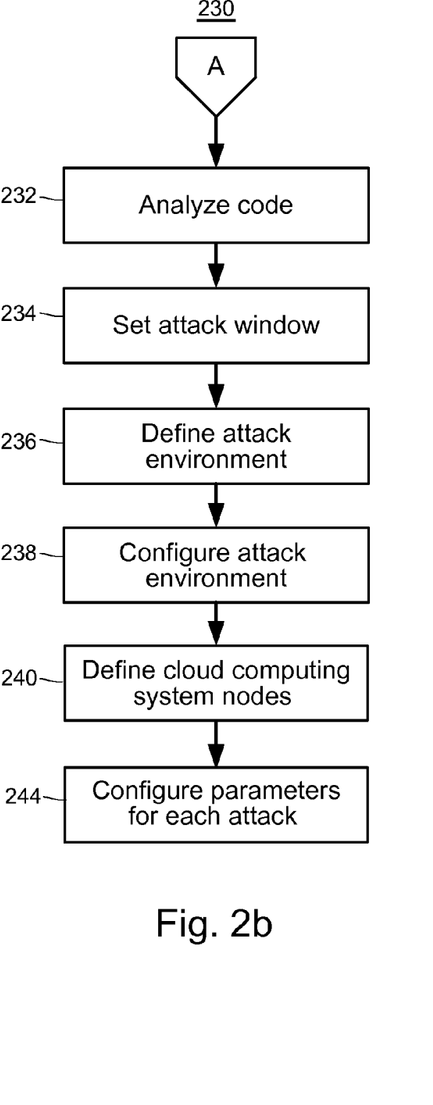
FIG. 2b illustrates a further embodiment of a flowchart for a method for application testing in a cloud computing system.

At function 204, the method may configure a test for the provisioned application code. In some embodiments, the test may be a functional or non-functional test. With reference to FIG. 2b, a configuration method 230 may include a function 232 to analyze the code to determine one or more components from the system 100 that may be used when executing the provisioned application code. For example, the function 204 may determine that one or more components 112 may be used by the provisioned application code during execution of the code. In other embodiments, active nodes within the cloud computing system that are stored in the metabase 127 and that utilize the provisioned application code during execution of the code are chosen for the test.

Figure 3A:
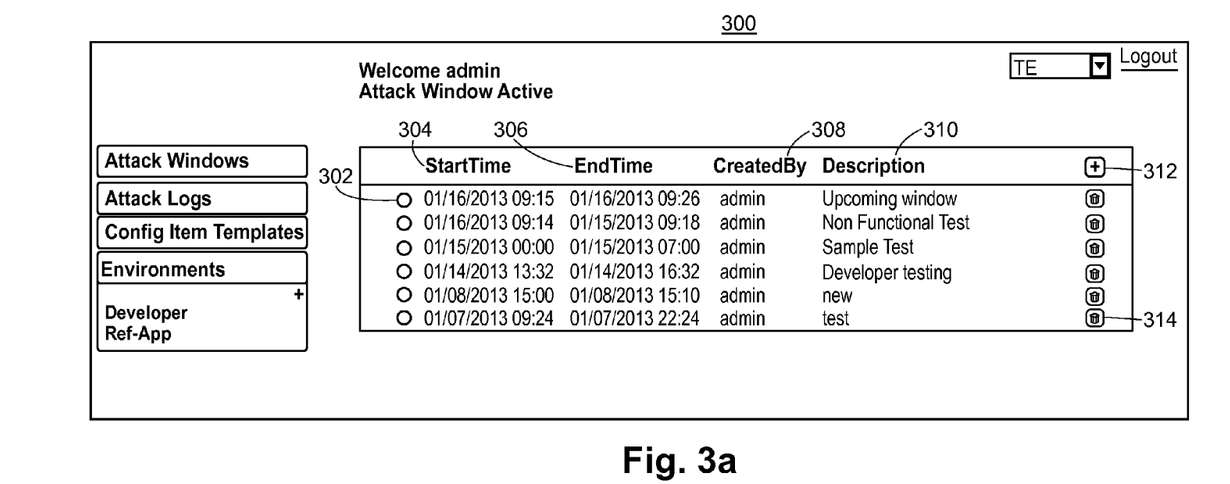
FIG. 3a illustrates one embodiment of a portion of a user interface for a system for testing applications in a cloud computing environment.

At function 234, the configuration method 230 may set an attack window. An attack window may include one or more start times and end times defining one or more periods of time during which the provisioned application code may be tested on the system 100. With reference to FIG. 3a, a user interface 300 may include an indication of attack window status 302 (e.g., expired, active, future, etc.), an attack window start time 304, an end time 306, a user name or group name 308 that created the attack window, and a description 310 of the window. In some embodiments, only particular users or groups of user with appropriate access privileges may create an attack window. In other embodiments, a creator of an attack window may specify other users that may configure or perform attacks. Some graphic elements 312, 314 displayed within the user interface 300 may be selectable by a user to activate functions to manage an attack window. For example, a "create attack window" graphic element 312 may be selectable to cause a processor to execute a function stored in memory that allows a user with appropriate privileges to create an attack window, while a "delete" graphic element 314 may be selectable to cause a processor to execute a function stored in memory that allows a user with appropriate privileges to delete an attack window. Of course, other graphic elements may be selectable to perform other attack window management functions (e.g., editing).

Figure 3B:
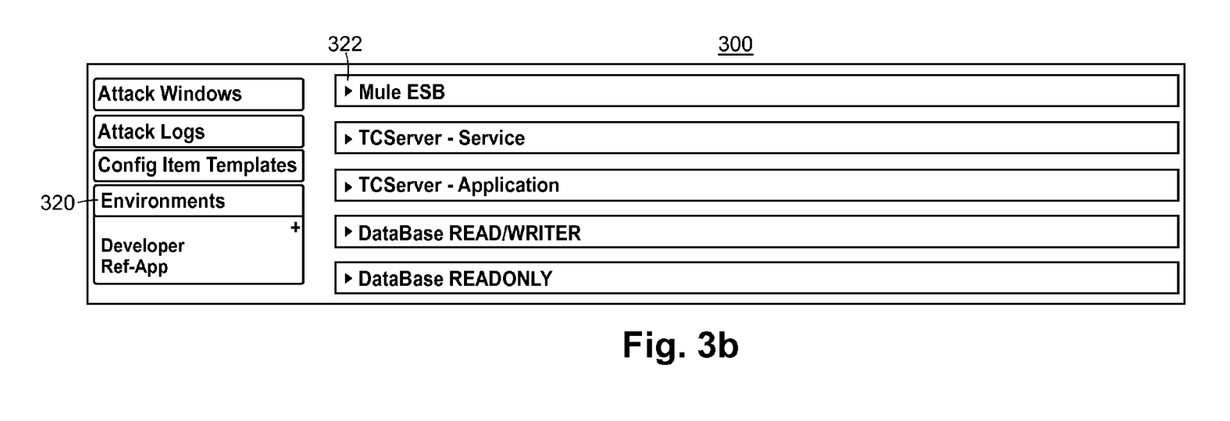
FIG. 3b illustrates one embodiment of a portion of a user interface for a system for testing applications in a cloud computing environment.

At function 236, the configuration method 230 may define an attack environment for the provisioned application code. In some embodiments, an attack environment includes a grouping the various virtual machines 112 within an application under test (AUT). With reference to FIG. 3b, the user interface 300 may include a selectable graphic element to cause a processor to execute a function that names or otherwise identifies an environment 320 for the application code.

At function 238, the configuration method 230 may configure the attack environment 320 for the provisioned application code that was defined by function 236. In some embodiments, an environment 320 is a grouping of cloud computing system node types or "configuration item instances" for the components of the system 100. For example, an environment 320 may include web application servers 112a, an enterprise service bus (ESB) server 112b, and other virtual machines 112c or any other component of the system 100 that is used by the application code or service 124a during execution on the system 100. The function 238 may select the particular cloud computing system node types of the system 100 to be included in an attack. With continued reference to FIG. 3b, the user interface 300 may include one or more selectable graphic elements to cause a processor to execute a function that adds cloud computing system node types 322 (i.e., cloud computing system nodes) to the environment defined at function 236. In some embodiments, a "drag and drop" action may add one or more cloud computing system nodes 233 to the environment 320.

Figure 3C:
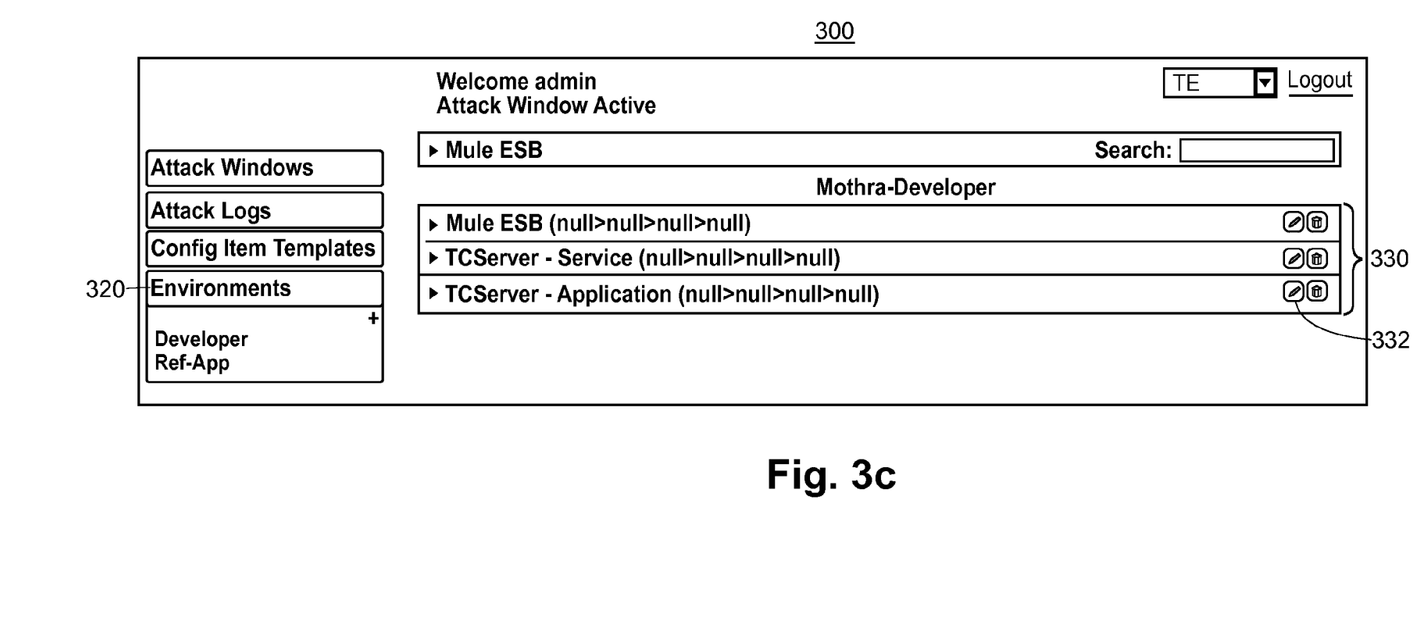
FIG. 3c illustrates one embodiment of a portion of a user interface for a system for testing applications in a cloud computing environment.

At function 240, the configuration method 230 may define or edit each cloud computing system node 322 added to the environment 320. With reference to FIG. 3c, the user interface 300 may include one or more cloud computing system nodes 322 that were added by the function 238 to the environment defined at function 236. In some embodiments, the user interface 300 of FIG. 3c may include a list of configuration items 330. The user interface 300 of FIG. 3c may also include one or more selectable graphic elements 332 that, upon selection, cause a processor to execute a function that adds cloud computing system nodes 322 to the environment defined at function 236. The cloud computing system nodes 322 may be stored as part of the configured attack file 128 (FIG. 1).

Figure 3D:
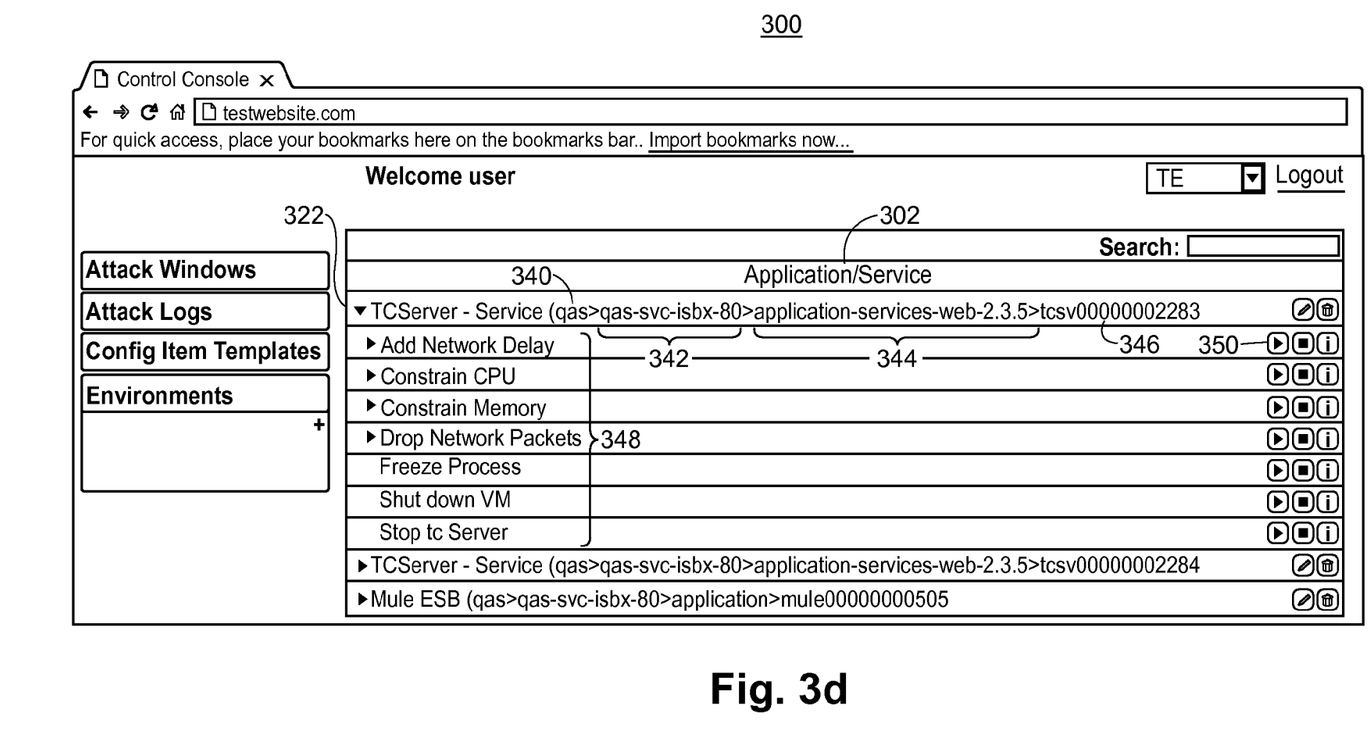
FIG. 3d illustrates one embodiment of a portion of a user interface for a system for testing applications in a cloud computing environment.

With reference to FIG. 3d, function 240 may also define particular cloud computing system nodes 322 from within the system 100. For example, the function 240 may define a working group 340, a virtual IP address 342, a context root 344, and a server name 346. Using the interface 300, attacks may be constrained to the various working groups 340, virtual IP addresses 342, context roots 344, and server names 346. Further, the attacks may be limited by time period, particular system users, or the types of attacks that are available within those time periods, as further described below.

At function 244, the configuration method 230 may configure parameters for one or more types of attacks 348 for each targeted cloud computing system node 322. For example, for a particular cloud computing system node 322, the function 244 may configure parameters for one or more of a network delay, a CPU constraint, a memory constraint, network packet drops, process freezes, virtual machine shut downs, web application or tc server stops, or another attack for the provisioned application code as it is executed within the system 100. As described in Table 1 below, each attack 348 may include one or more parameters that may be configured by the function 244 for an attack on a particular cloud computing system node 322. The configured parameters may be stored as the configuration parameters 128*b* of the configured attack file 128 (FIG. 1). Of course, the system described herein could be configured to launch any other type of attack on the AUT.

TABLE 1

| Attack | Parameter(s) | Description |
| --- | --- | --- |
| Drop Network Packets | Destinations | Comma separated list destination IP address or host names |
|  | DropRate | Percentage of packets to drop 0-100 |
| Add Network Delay | Destinations | Comma separated list destination IP address or host names |
|  | Delay | Network delay specified in milliseconds. Can add the following suffixes ns-nanoseconds, s-seconds, m-minutes for changing unit of time |
| Constrain CPU | ResourceLimit | CPU cycle limit in MHz |
| Constrain Memory | ResourceLimit | Memory limit in MB |
| Disable Mule Flow | MuleFlow | Name of the flow to be disabled |

Returning to FIG. 2*a*, after configuring the application test/attack, the method 200 may cause a processor to execute a function 205 stored in memory to begin the configured application test/attack for the AUT. The method 200 may then cause a processor to execute a function 206 stored in memory that causes the system 100 to launch the configured attack. In some embodiments, a user or an automated process may initiate the application attack using the interface 300. For example, using a mouse or other pointing device, a user may select a selectable graphic element 350 that may, upon selection, cause a processor to execute the function 206. Selecting the element 350 may cause the system 100 to execute one or more instructions to complete the application testing process as herein described. In some embodiments, the function 206 may access a configured attack file 128 indicating one or more cloud computing system nodes 128*a* (328) and parameters 128*b*, as described herein. The function 206 may then access a memory of the system 100 including the configured attack file 128 and use the file 128 to modify operation of the system 100 according to the file 128 by identifying the cloud computing system nodes 128*a* and configuration parameters 128*b* for each attack on a node within the file 128 while the application file 124*a* is executing on the system.

Figure 3E:
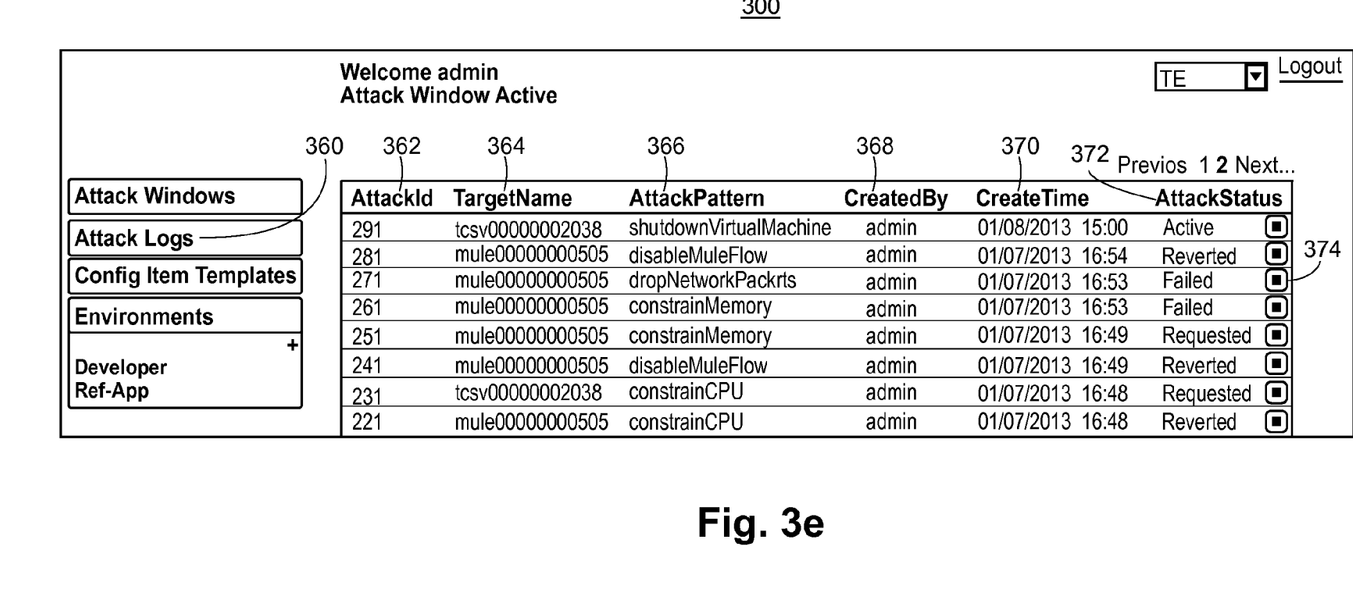
FIG. 3e illustrates one embodiment of a portion of a user interface for a system for testing applications in a cloud computing environment.

With reference to FIG. 3*e*, launching the attack with function 206 may also generate one or more attack logs 360 including data related to the configured attacks described above in relation to the configuration method 230. An attack log 360 may include an attack identification 362, an attack target or name 364 (e.g., the server name 346), an attack pattern 366 (e.g., the attack type 348), a user name or group name 368 that created the attack window, a time the attack was created 370, and an attack status 372. The attack log 360 may also include a revert graphic element 374 that, upon selection, executes a function to stop a corresponding attack pattern 366 and reset a corresponding server 364 to its state before launching the attack. If successful, the status of the reverted attack will change to "Reverted." Returning to FIG. 2*a*, once the configured application test/attack is complete, the method 200 may cause a processor to execute a function 207 stored in memory to stop the test and evaluate test results.

Figure 4:
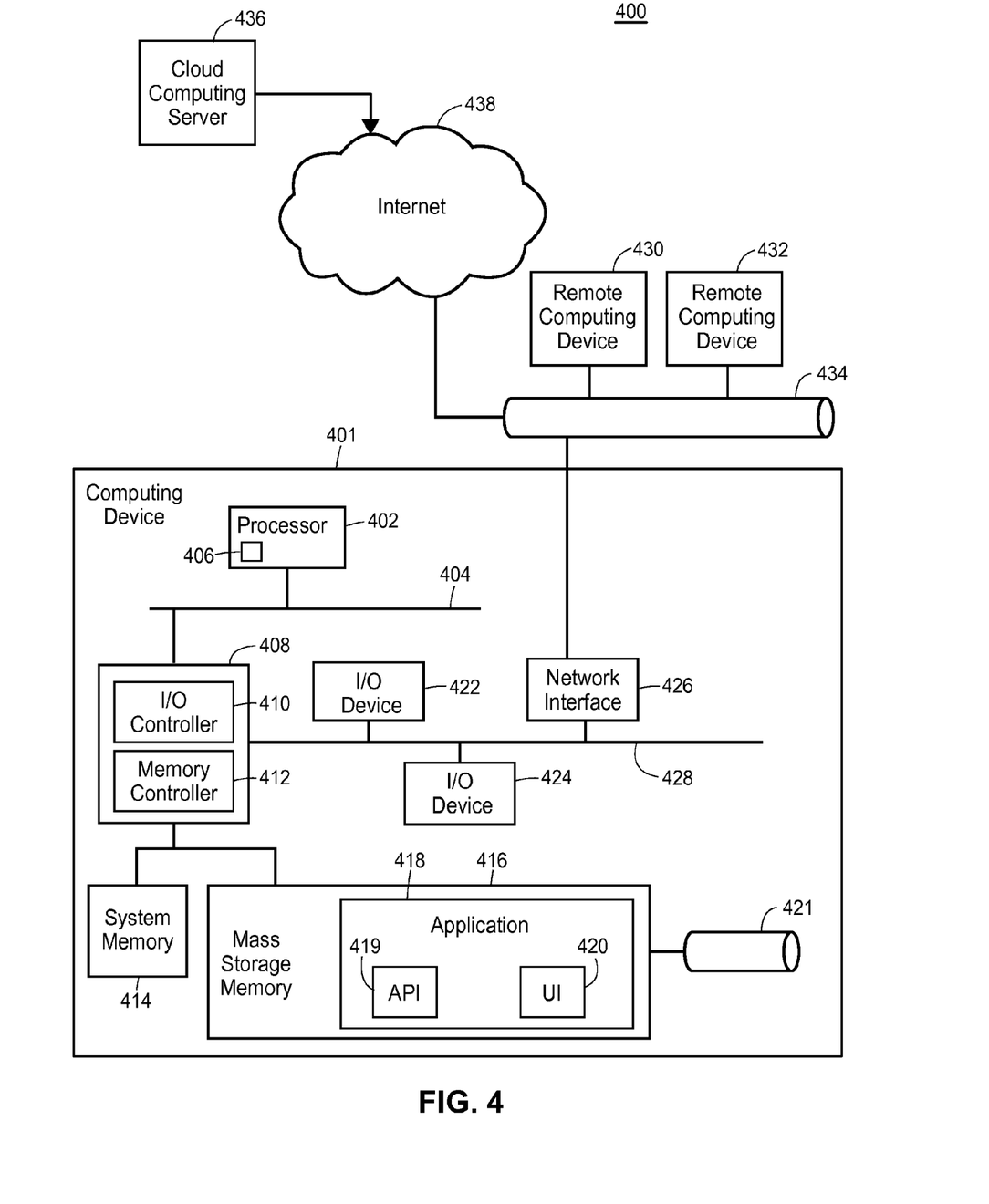
FIG. 4 illustrates a block diagram of a computer to implement the various methods and functions for application testing code in the cloud computing system.

FIG. 4 is a high-level block diagram of an example computing environment for a system and method for application/service testing among various cloud computing system assets. The computing device 401 may include a server, a client computing device (e.g., a personal computer, a tablet computer, a Wi-Fi-enabled device, cellular phone, or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example application testing system 400 may be used to implement and execute the example system of FIG. 1, the example methods of FIGS. 2*a* and 2*b*, the user interfaces of FIGS. 3*a*-3*e*, and the like. Although the example system 400 is described below as including a plurality of peripherals, interfaces, chips, memories, etc., one or more of those elements may be omitted from other example processor systems used to implement and execute the example system 100 including an application testing module 108, automation service 116, monitoring and management components 110, application components 112, an application provisioning and management server 126, etc. Also, other components may be added.

As shown in FIG. 4, the computing device 401 includes a processor 402 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 410 and a peripheral input/output (I/O) controller 412. As is well known, a chipset typically provides I/O and memory management functions as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416.

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement a application testing system 100 having an API 419 (including functions and instructions as described by the methods 200 and 230 of FIGS. 2*a* and 2*b*, respectively), and module 108 to receive user input (e.g., the application/service code 124*a*, selected cloud computing system nodes 128*a*, configuration parameters 128*b*, etc.), the mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. In one embodiment, non-transitory program functions, modules and routines (e.g., methods 200 and 230, etc.) are stored in mass storage memory 416, loaded into system memory 414, and executed by a processor 402 or can be provided from computer program products that are stored in tangible computer-readable storage mediums (e.g. RAM, hard disk, optical/magnetic media, etc.). Mass storage 416 may also include a cache memory 421 storing application data, user profile data, and timestamp data corresponding to the application data, and other data for use by the application 418.

The peripheral I/O controller 410 performs functions that enable the processor 402 to communicate with peripheral input/output (I/O) devices 422 and 424, a network interface 426, via a peripheral I/O bus 428. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 422 and 424 may be used with the application 418 to provide a module 108 and other interfaces for the system 100, as described in relation to the figures. The local network transceiver 428 may include support for Wi-Fi network, Bluetooth, Infrared, cellular, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100, 600 to communicate with another computer system having at least the elements described in relation to the systems 100, 600.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The system 400 may also implement the module 108 and various system modules on remote computing devices 430 and 432. The remote computing devices 430 and 432 may communicate with the computing device 401 over a network link 434. For example, the computing device 401 may receive location data created by an application executing on a remote computing device 430, 432. In some embodiments, the application 418 including the module 108 may be retrieved by the computing device 401 from a cloud computing server 436 via the Internet 438. When using the cloud computing server 436, the retrieved application 418 may be programmatically linked with the computing device 401. The application 418 may be a Java® applet executing within a Java® Virtual Machine (JVM) environment resident in the computing device 401 or the remote computing devices 430, 432. The application 418 may also be a web-based application (e.g., the module interface 108 of FIG. 1) adapted to execute in a web-browser located on the computing devices 401, 430, and 432. In some embodiments, the application 418 may communicate with back end components 440 via the Internet 438 or other type of network.

Using the system 100 and methods 200 and 230 described herein, an application testing module 108 and various interfaces 300 coupled with the methods 200 and 230 may allow rapid application testing that causes or simulates failures within the system 100 in support of both application and infrastructure testing. The module 108 and system 100 described herein may support a variety of "attacks" including the ability to stop or freeze application servers, insert latency or drop packets between servers, constrain CPU or memory, and disable various software flows (e.g., a Mule flow) and applications. Rather than randomly inserting "chaos" into cloud-based computing systems to test their durability and the efficacy of particular applications or services that are executing within the system, the system and methods described herein include a user interface 300 for manually controlling the system attacks.

For example, the system 100 and methods 200, 230 may initiate both application failure point testing and infrastructure testing. With application failure point testing, the system 100 and methods 200, 230 may run an application script, execute various attacks on underlying components at appropriate times for execution of the application script, and verify that the script handled the attacks correctly. With infrastructure testing, the system 100 and method 200, 230 may generate traffic for a service, cause a failure with the user interface 300, and verify that the infrastructure handled the attacks and the service continued to operate.

The following additional considerations apply to the foregoing discussion. Throughout this specification, plural instances may implement functions, modules, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the network 438, may include but is not limited to any combination of a LAN, a MAN, a WAN, a mobile, a wired or wireless network, a private network, or a virtual private network. Moreover, while only one module 108 is illustrated in FIG. 1 to simplify and clarify the description, it is understood that any number of instances of the module 108 are supported and can be in communication with the system 100 or system 400.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "method" or a "function" or an "algorithm" or a "routine" is a self-consistent sequence of operations or similar processing leading to a desired result. In this context, methods, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100, 400 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and method for application and service testing among various cloud computing system assets through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for testing computer code in a cloud computing environment, the method comprising:
provisioning a computer code file via one or more processors and a module interface to an automation service, wherein the computer code file includes a discrete file or package of files corresponding to a complete application or an update for the application for execution on a plurality of cloud computing system nodes;
determining, via one or more processors, one or more cloud computing system nodes that the computer code file utilizes during execution in the cloud; and
receiving, via one or more processors, data that defines one or more attack conditions for the determined cloud computing system nodes at the automation service via the module interface;
wherein the attack conditions include one or more of an attack window, an attack environment, a network delay, a CPU constraint, a memory constraint, a network packet drop, a process freeze, a virtual machine shut down, or a web application server stop, and parameters for the attack conditions include:
a comma separated list destination IP address or host name and a network delay for the network delay attack condition,
a CPU cycle limit for the CPU constraint attack condition,
a memory limit for the memory constraint attack condition, and
the comma separated list destination IP address or host name and a percentage of packets to drop for the network packet drop attack condition.

2. The computer-implemented method of claim 1, wherein the attack environment includes one or more of the determined cloud computing system nodes.

3. The computer-implemented method of claim 2, wherein the determined cloud computing system nodes include one or more of a web application server, an ESB server, or other virtual machines.

4. The computer-implemented method of claim 3, further comprising receiving, via one or more processors, a target for each determined cloud computing system node.

5. The computer-implemented method of claim 4, wherein each target includes one or more of a working group, a virtual IP address, a context root, and a server name.

6. The computer-implemented method of claim 1, wherein the attack window includes a start time, an end time, and an identification of a user that is allowed to utilize the attack window.

7. The computer-implemented method of claim 1, further comprising storing, via one or more processors, an identification for each cloud computing system node and the received parameters as a configured attack file.

8. A computer device for testing computer code in a cloud computing environment the computer device comprising:
one or more processors; and
one or more memories coupled to the one or more processors;
wherein the one or more memories include computer executable instructions stored therein that, when executed by the one or more processors, cause the one or more processors to:
provision a computer code file via a module interface to an automation service, wherein the computer code file includes a discrete file or package of files corresponding to a complete application or an update for the application for execution on a plurality of cloud computing system nodes;
determine one or more cloud computing system nodes that the computer code file utilizes during execution in the cloud; and
receive data that defines one or more attack conditions for the determined cloud computing system nodes at the automation service via the module interface;
wherein the attack conditions include one or more of an attack window, an attack environment, a network delay, a CPU constraint, a memory constraint, a network packet drop, a process freeze, a virtual machine shut down, or a web application server stop, and parameters for the attack conditions include:
a comma separated list destination IP address or host name and a network delay for the network delay attack condition,
a CPU cycle limit for the CPU constraint attack condition,
a memory limit for the memory constraint attack condition, and
the comma separated list destination IP address or host name and a percentage of packets to drop for the network packet drop attack condition.

9. The computer device of claim 8, wherein the attack environment includes one or more of the determined cloud computing system nodes and the determined cloud computing system nodes include one or more of a web application server, an ESB server, or a virtual machine.

10. The computer device of claim 9, wherein the computer executable instructions, when executed by the one or more processors, further cause the one or more processors to receive a target for each determined cloud computing system node.

11. The computer device of claim 10, wherein each target includes one or more of a working group, a virtual IP address, a context root, and a server name.

12. The computer device of claim 8, wherein the attack window includes a start time, an end time, and an identification of a user that is allowed to utilize the attack window.

13. The computer device of claim 8, wherein the computer executable instructions, when executed by the one or more processors, further cause the one or more processors to store an identification for each cloud computing system node and the received parameters as a configured attack file.

14. A tangible computer-readable memory including non-transitory computer readable instructions stored thereon for testing computer code in a cloud computing environment, the instructions comprising:
    provision a computer code file via a module interface to an automation service, wherein the computer code file includes a discrete file or package of files corresponding to a complete application or an update for the application for execution on a plurality of cloud computing system nodes;
    determining one or more cloud computing system nodes that the computer code file utilizes during execution in the cloud; and
    receiving data that defines one or more attack conditions for the determined cloud computing system nodes at the automation service via the module interface;
    wherein the attack conditions include one or more of an attack window, an attack environment, a network delay, a CPU constraint, a memory constraint, a network packet drop, a process freeze, a virtual machine shut down, or a web application server stop, and parameters for the attack conditions include:
        a comma separated list destination IP address or host name and a network delay for the network delay attack condition,
        a CPU cycle limit for the CPU constraint attack condition,
        a memory limit for the memory constraint attack condition, and
        the comma separated list destination IP address or host name and a percentage of packets to drop for the network packet drop attack condition.

15. The tangible computer-readable medium of claim 14, wherein the attack environment includes one or more of the determined cloud computing system nodes and the determined cloud computing system nodes include one or more of a web application server, an ESB server, or a virtual machine.

16. The tangible computer-readable medium of claim 15, wherein the instructions further comprise receiving a target for each determined cloud computing system node and each target includes one or more of a working group, a virtual IP address, a context root, and a server name.

17. The tangible computer-readable medium of claim 14, wherein the instructions further comprise storing an identification for each cloud computing system node and the received parameters as a configured attack file.

* * * * *